Jan. 19, 1971  C. MORALES ET AL  3,555,885
FIRE-FIGHTING FOAM PORTABLE TEST KIT

Filed July 14, 1969  3 Sheets-Sheet 1

INVENTORS.
CARMELO MORALES
JOHN J. D'AMBROSIO
IRA WILDER
BY
Ernest J. Weinberger

ATTORNEYS

INVENTORS.
CARMELO MORALES
JOHN J. D'AMBROSIO
IRA WILDER
BY
ATTORNEYS ns mounted within the carrying case; and
United States Patent Office 3,555,885
Patented Jan. 19, 1971

3,555,885
FIRE-FIGHTING FOAM PORTABLE TEST KIT
Carmelo Morales, Brooklyn, and John J. D'Ambrosio, Maspeth, N.Y., and Ira Wilder, Fair Lawn, N.J., assignors to the United States of America as represented by the Secretary of the Navy
Filed July 14, 1969, Ser. No. 841,469
Int. Cl. G01n 33/00
U.S. Cl. 73—61.1          3 Claims

ABSTRACT OF THE DISCLOSURE

A portable test kit for evaluating the condition of fire-fighting foam including a carrying case having a clear plastic inner door, a centrifuge mounted in the case, timing devices, a mixer, a strainer, assorted beakers, and related equipment. A microswitch is mounted in the case so that the centrifuge cannot be operated unless the clear plastic inner door is closed.

---

The invention described herein may be manufactured and used by or for the Government of the United States of America for governmental purposes without the payment of any royalties thereon or therefor.

BACKGROUND OF THE INVENTION

Field of the invention

The present invention relates to fire-fighting foams and more particularly pertains to an assembled kit for evaluating stored foam to ascertain its suitability, condition and ability to fight fire.

Description of the prior art

In the field of fire-fighting, it has been the general practice to periodically check the suitability of stored fire-fighting foams by forwarding samples to testing laboratories at regular time intervals. Such methods have been unsatisfactory in that they are impractical, time consuming and prohibitively expensive. Additionally, from a safety and economy viewpoint, it is too late to wait for a situation involving a fire to determine the condition of the foam or to simply set an arbitrary time period or storage life before replacement. The present invention overcomes these problems by providing a kit for field evaluation capable of being performed by unskilled personnel.

SUMMARY OF THE INVENTION

The general purpose of this invention is to provide a portable, in field, fire-fighting foam evaluation kit that has all the advantages of laboratory testing and none of the above described disadvantages. To attain this, the present invention provides a unique arrangement of testing methods and equipment packaged in a container for use in the field by unskilled personnel. The equipment is capable of performing three separate go-no go tests, which include drainage, clogging and sediment tests.

An object of the present invention is to provide a reliable, simple, inexpensive portable fire-fighting foam test kit that can be readily operated in the field.

Other objects and many of the attendant advantages of this invention will be readily appreciated as the same becomes better understood by reference to the following detailed description when considered in connection with the accompanying drawings.

DESCRIPTION OF A PREFERRED EMBODIMENT

Figure 1:
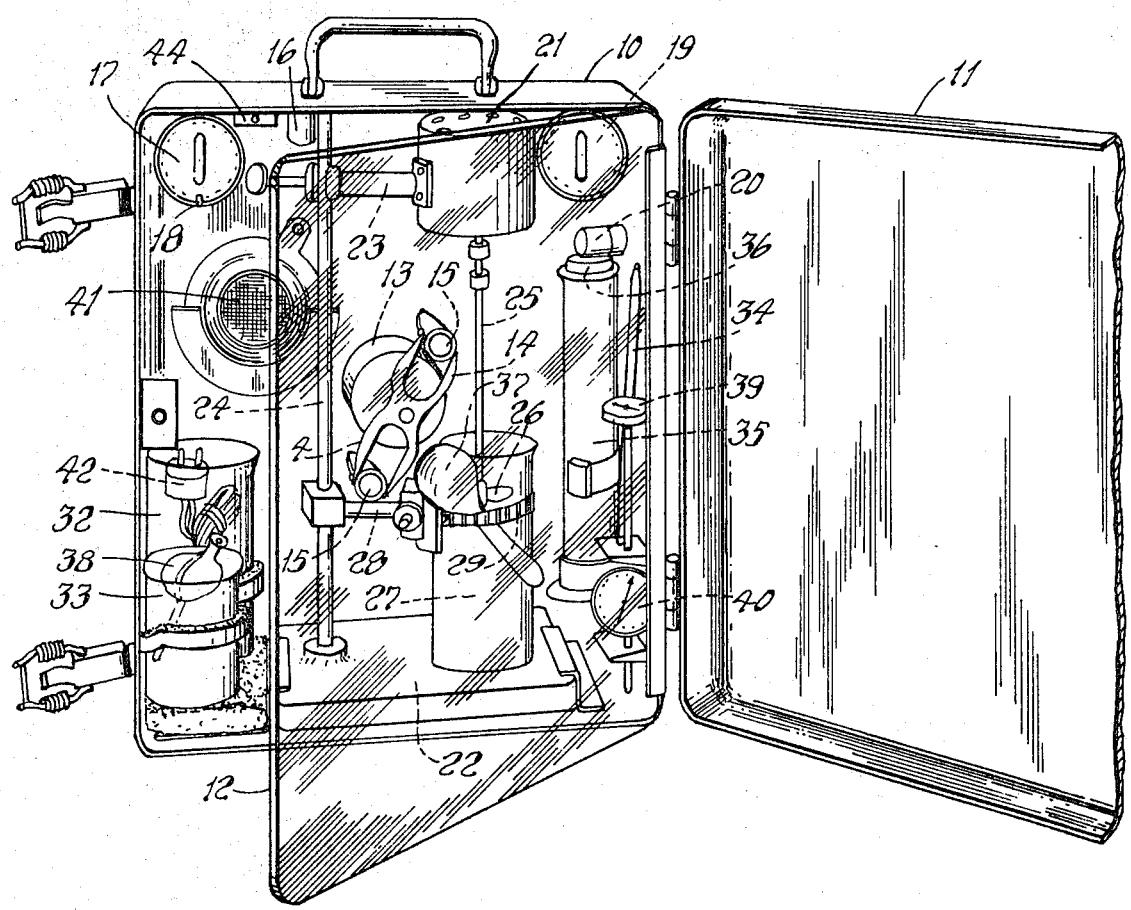
FIG. 1 is a front view of the open carrying case with the components stored and positioned therein.

All the necessary components or equipment for performing three tests to determine the condition and useability of fire-fighting foam-liquid are illustrated in FIG. 1 in a light weight aluminum carrying case 10 which is provided with an outer door 11. An inner transparent acrylic door 12 is mounted so as to close across the case opening. Permanently mounted into the case 10 (also see FIG. 2) on the back side thereof, facing inwardly is a small fractional high speed motor 13 which carries on its shaft a pair of opposing arms 14 which pivotly support a pair of plastic centrifuge tubes 15 in metal holder tubes 15'. The motor is electrically connected to a power line receptacle 16 through a timer 17 having a fixed time stop 18. Also mounted on the back of the case is another timer 19 which provides power from the receptacle 16 to the foam maker outlet 20.

Figure 3:
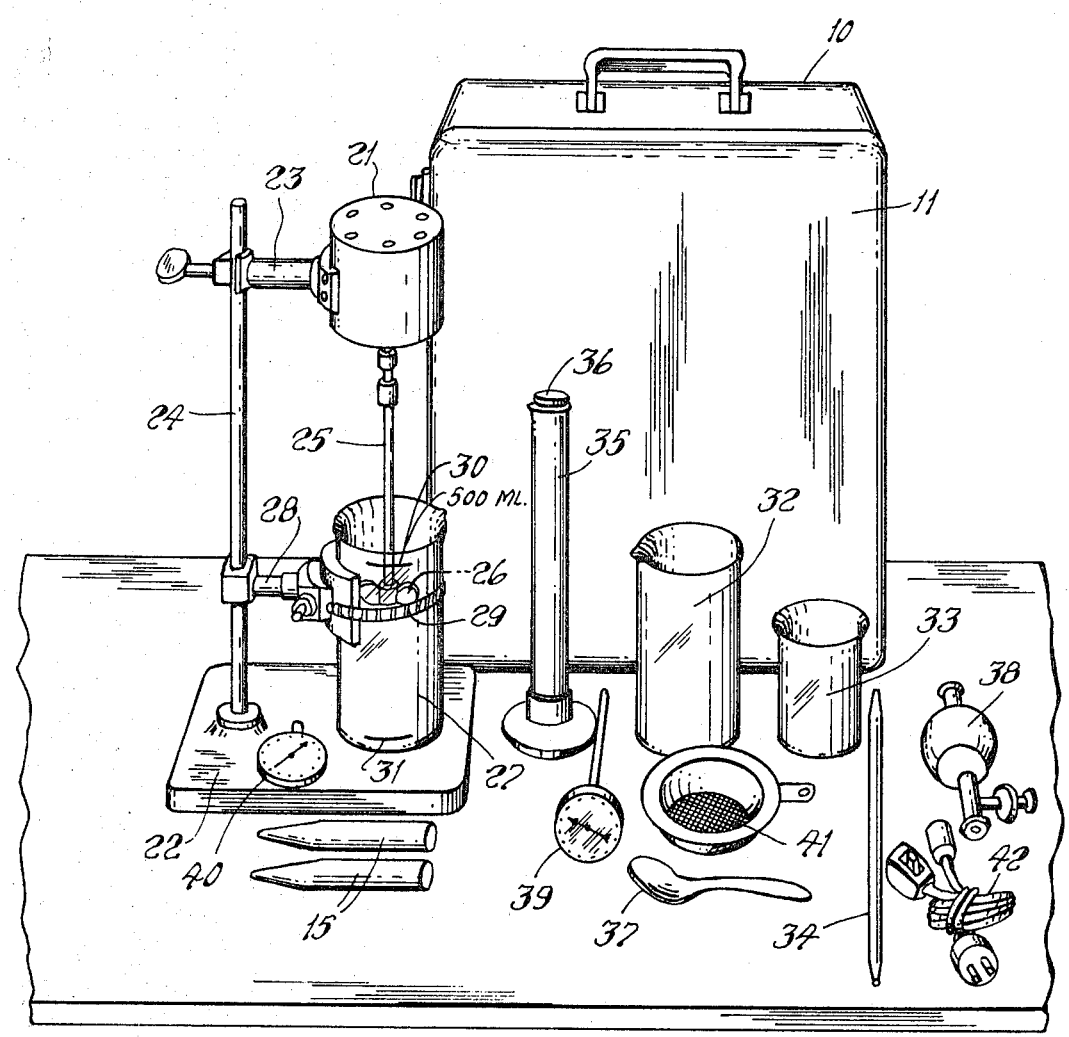
FIG. 3 shows the removable components outside the carrying case.

Referring now to FIGS. 1 and 3, there is removably carried within the case and supported for transport therein a foam maker which comprises a high speed (3000 r.p.m.) fractional horsepower motor 21 supported above a base 22 by adjustable clamp 23 via rod 24. Shaft 25 extends downwardly and is coupled to the motor 21 and carries at its free end a multiple bladed propeller 26. A drainage test plastic beaker 27 (500 ml.) seated on the base 22 is secured directly below the motor with the propeller 26 extending therein, by adjustable clamp 28 and chain clamp 29. The drainage test beaker is provided with a pair of marked levels 30 and 31. Another plastic 500 ml. beaker 32 as well as a 250 ml. beaker 33, a plastic 5 ml. drainage test pipette 34 and a graduated 100 ml. plastic cylinder 35 with a rubber stopper 36 are carried in the case. Auxiliary components include a plastic spoon 37, a rubber bulb 38 for the pipette, a bimetallic thermometer 39 and a stop watch 40, an 80 mesh strainer 41 and power cord assembly 42 for suplying power to the receptacle 16 from an external source of electrical energy. Also carried by the case and mounted thereon is an electrical interlock switch (microswitch) 44 which is connected between the receptacle 16 and the centrifuge timer 17 so that the centrifuge motor will only be activated when the plastic door 12 is closed.

Figure 2:
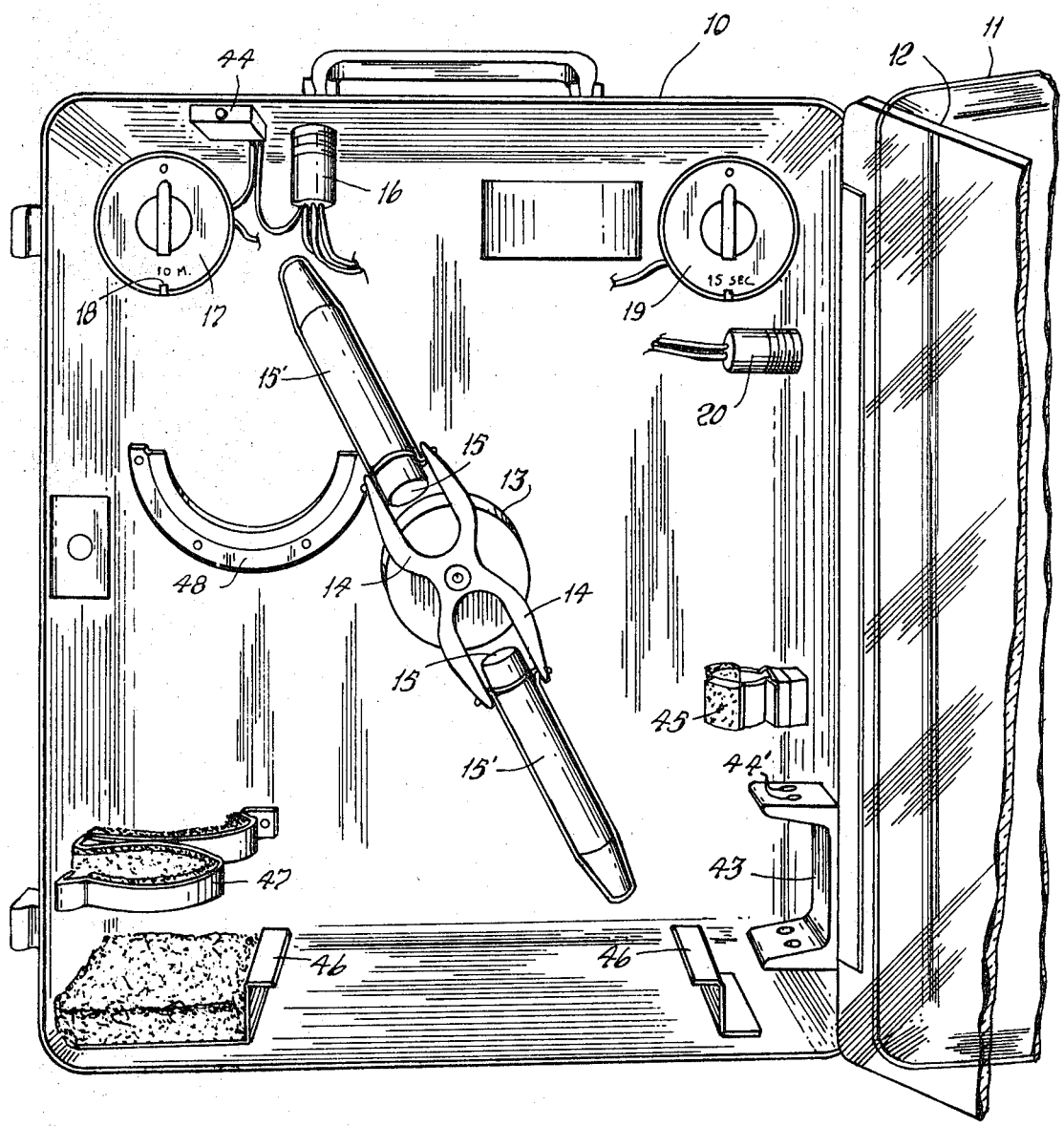
FIG. 2 is another front view showing the fixed components mounted within the carrying case.

FIG. 2 illustrates the supporting members affixed to the inner walls of the case which includes a U channel 43, having a pair of aligned holes 44' for holding the thermometer 39, watch 40, pipette 34. Lined spring holder 45 retains the graduated cylinder 35 while the Z-shaped brackets 46 hold the base 22 and its necessary components. The beakers and other smaller components therein are held by the lined double loop 47 while the strainer is held by flange 48.

TEST OPERATION

Initially, all the removable components are removed from the case 10 and the case positioned on its back and the power supply cord inserted into the receptacle 16 and the opposite end connected to a power source. The beaker 27 is filled with 500 ml. of the foam-liquid to be evaluated, spooning off any excess foam bubbles formed during the filling of the beaker. From the beaker 27 12.5 ml. of the foam are placed in each of the centrifuge tubes 15. With the strainer 41 disposed over the open end of beaker 32, the foam remaining in the beaker 27 is poured through the strainer 41. If all the liquid-foam does not pass through the strainer the sample is unsuitable for its intended use and it has failed the "clogging test." Assuming all the foam-liquid has passed through the strainer, the strained liquid in beaker 32 is set aside for further evaluation.

The centrifuge tubes 15 are placed in the holders 15', the centrifuge timer set for ten minutes and the plastic door 12 closed, thus energizing the centrifuge motor 13. After the centrifuge stops the door may be opened and the tubes 15 removed for examination. With the mouth of each closed, the tubes are inverted and the quantity of sediment is observed. By providing a mark or indicia on each tube the quantity of sediment can be readily ascertained. In general, if the sediment in either tube exceeds 0.5%, then the foam-liquid is unsuitable. Where the sediment does not exceed 0.5%, then 5 ml. of the strained foam-liquid from beaker 32 is placed in the graduated cylinder 35 via the pipette 34. Fresh water at a temperature of approximately 70° F. from beaker 33 is added to cylinder 35 to provide a total of 100 ml. In this pouring, bubbling may be prevented by tilting the cylinder and pouring the water slowly along the side wall thereof. With stopper 36 over the cylinder opening, the cylinder is inverted approximately ten times. The resulting mixture is then transferred to beaker 27 and, with the propeller 26 therein, the motor 21 is activated for approximately 15 seconds. When the motor stops, the propeller is raised above the foam and with the stop watch 40, the time for the drained liquid to reach the 25 ml. level 31 is determined. This drainage test should be repeated and if the average time is 75 seconds or more the liquid is suitable.

In the event the foam liquid specimen passes all three of the afore-described tests it is useable. On the other hand, if it should fail any one of these tests the foam to be generated by the foam-liquid is ineffective for fire-fighting and the stored liquid-foam discarded and replaced.

We claim:
1. A portable fire-fighting foam test kit comprising:
a carrying case having an outer door,
an electrical centrifuge affixed to an inner wall of said case,
a receptacle source of electrical energy carried by said case,
a mechanical timer,
electrical means electrically connecting said centrifuge and said timer and said receptacle,
an inner hinged transparent door supported to close across said case internally of said outer door,
a microswitch electrically connected between said timer and said receptacle and in the path of said inner door so as to be activated when said inner door is closed,
means carried by said case adapted to support and having therein, beakers, a foam maker means, a strainer, a second timer, quantity measuring means.

2. The kit according to claim 1 wherein said foam maker includes:
a base member,
support means carried by said base for adjustably supporting thereabove,
an electric motor having a depending shaft,
said shaft carrying at its free end a propeller having a set of multiple blades.

3. A method for ascertaining the suitability and useability of a stored fire-fighting foam liquid which comprises the steps of:
centrifuge a specimen of approximately 12.5 ml. of said foam liquid in each of two tubes for approximately ten minutes at 1500 r.p.m.,
closing said tubes and inverting the same,
measuring the proportion of sediment in each of said tubes,
passing approximately 475 ml. of said specimen through an 80 mesh strainer,
ascertaining whether all of said specimen has passed through said strainer,
mix 5 ml. of said strained foam-liquid with fresh water at 70° F. to provide 100 ml. of mixture,
foaming said mixture for 15 seconds with a propeller at 3000 r.p.m.,
measure the time for said foam mixture to liquify.

References Cited
UNITED STATES PATENTS
3,267,723  8/1966  Robinson _____ 73—61

OTHER REFERENCES

Millipore, Measurement of Surface Active Agent Contamination, in Analysis and Control of Contamination in Aviation Fuels, pp. 17–18, January 1968.

LOUIS R. PRINCE, Primary Examiner

J. W. ROSKOS, Assistant Examiner

U.S. Cl. X.R.
73—432